Oct. 7, 1930.   F. W. BAKER   1,777,711
VEHICLE WHEEL
Filed March 11, 1925
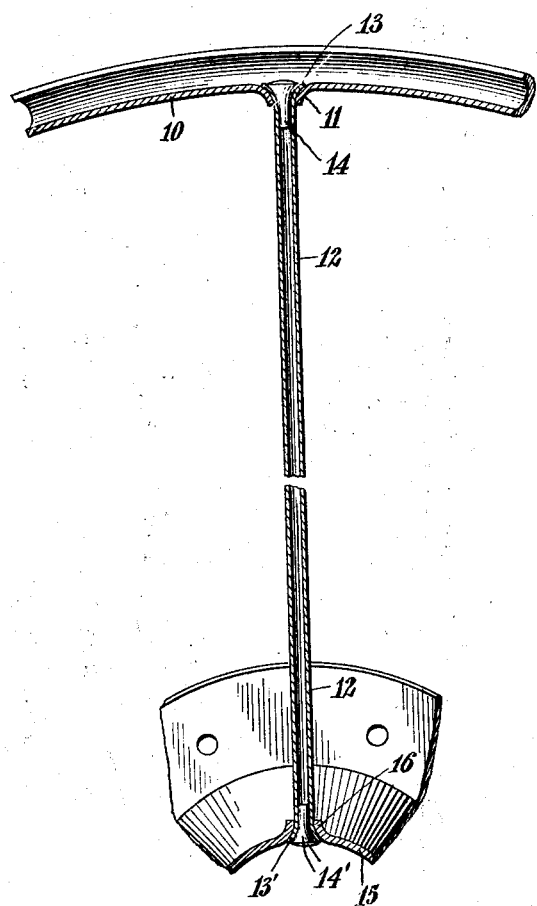

Patented Oct. 7, 1930

1,777,711

UNITED STATES PATENT OFFICE

FREDERICK W. BAKER, OF STOURBRIDGE, ENGLAND, ASSIGNOR TO TRINITY WHEEL CORPORATION, A CORPORATION OF NEW YORK

VEHICLE WHEEL

Application filed March 11, 1925. Serial No. 14,675.

My invention relates to improvements in the manufacture of vehicle wheels and particularly wheels known as wire wheels. The object of the invention is to simplify, cheapen and strengthen such wheels and to provide a method which can be easily and economically carried out.

Reference is to be had to the accompanying drawings forming a part of this specification, in which similar reference characters indicate corresponding parts.

The figure is a broken sectional view of the wheel embodying my invention.

By way of example I have shown a simple type of wheel having a felly 10 of the usual or any preferred type but it should be of sheet metal. At intervals where the spokes are to be attached the felly is punched to produce protruding burrs constituting the ferrules 11, and the spokes 12 which are tubular are inserted in the several burred ferrules 11 and their outer ends spread as shown at 13 so that the felly and spokes will thus interlock and will fit nicely, one against the other. The plug 14 is then wedged into the outer open end of the spoke and the parts are welded together. This can be done in an ordinary welding machine.

The connection between the spoke and hub is of precisely the same character. The hub 15 is likewise formed of sheet metal, is punched outwardly to form the burred ferrule 16, while the inner end of the spokes 12 enter the burred ferrules 16, are spread as already described to form the inner end portion 13′, and plugs 14′ are inserted in these spread ends, thus wedging the parts together, the wheel joint being finally welded as above described. The plugs 14 and 14′ are of elongated formation each having the head end and shank end so that when the plug is driven into the spoke the head will entirely fill the flared end of said spoke and the shank end protrude a considerable distance within the spoke beyond its point of connection with the felly or hub for reinforcement to the parts.

Thus it will be seen that the wheel is very cheaply and strongly made and the invention can be applied to any wheels of the type referred to having tubular spokes and metallic hubs and fellies capable of carrying the ferrules 11 and 16 as described.

I claim:

1. A wheel structure having a hollow spoke provided with a flared end engaging a complementary member of the wheel with a spoke receiving tapered opening burred concentrically with the same, and a plug snugly engaged in the tapered end of the spoke and having a head entirely filling the flared end and also having a shank extended within the spoke a considerable distance thereof.

2. In a wheel construction, a tubular spoke, a felly having an opening for the outer end of the spoke, the wall of the opening being burred and converging beyond the inner periphery of said felly, and a plug inserted in the outer end of the spoke and having a wedge head and an elongated shank, the head spreading the outer end of the spoke correspondingly to the convergence of the burred wall of the opening and the shank snugly extended within the spoke a considerable distance beyond the point of engagement of the spoke and felly.

In testimony whereof, I have signed my name to this specification this 6th day of March, 1925.

FREDERICK W. BAKER.